United States Patent Office 2,698,920
Patented Jan. 4, 1955

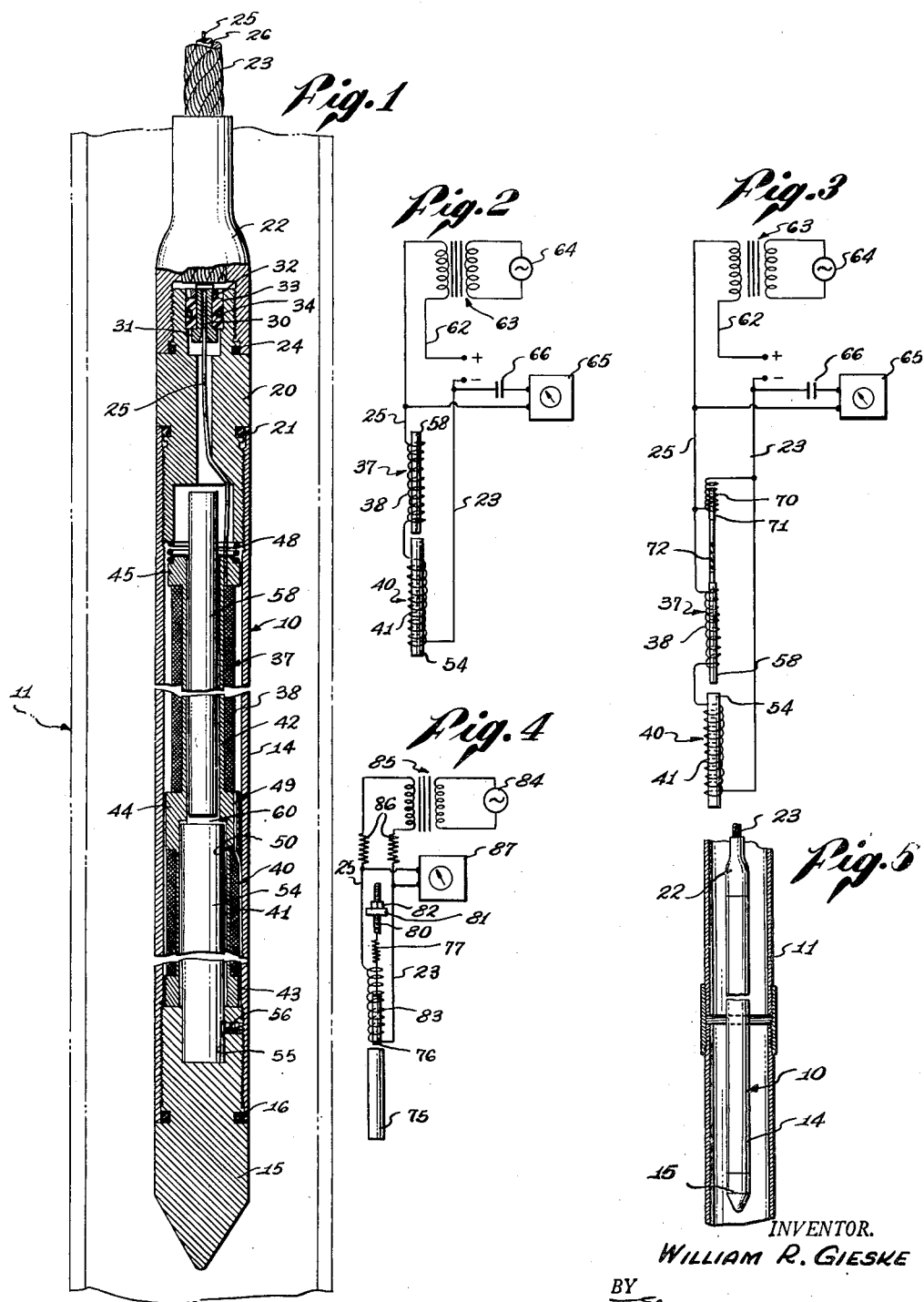
Jan. 4, 1955     W. R. GIESKE     2,698,920
APPARATUS FOR EXPLORING PIPE IN WELLS
Filed March 6, 1951
INVENTOR.
WILLIAM R. GIESKE
BY Elwood S. Kendrick
Attorney

2,698,920

APPARATUS FOR EXPLORING PIPE IN WELLS

William R. Gieske, Whittier, Calif., assignor, by mesne assignments, to The Ford Alexander Corporation, Whittier, Calif., a corporation of California Application March 6, 1951, Serial No. 214,085

14 Claims. (Cl. 324—34)

My invention relates to methods and devices employed for ascertaining data about pipe in a well and especially for locating the point at which a pipe is stuck in a well, the term pipe including oil well casing, tubing and the like. The invention relates specifically to procedures that involve applying force to stress the pipe above the stuck point and testing the pipe at various levels for yield to the stress, the stuck point being at the level where the pipe ceases to yield.

The general object of the invention is to provide a simple but highly sensitive detecting device together with a simple procedure that may be used not only to find the level of the stuck point but also to locate the nearest coupling or pipe joint above the stuck point.

Several devices and techniques have been suggested heretofore for ascertaining whether or not a pipe yields at various levels in a well in response to stress applied at the upper end of the pipe. In general, the successful devices heretofore developed require anchorage to the surrounding pipe at one or more points, usually two points, and have relatively movable parts that respond to local yielding movement of the pipe.

My co-pending application, Serial No. 214,086, entitled Apparatus for Locating Stuck Pipe in Wells, filed on or about March 6, 1951, which is hereby made a part of the present disclosure by reference, sets forth how the necessity for anchoring the detector unit to the surrounding pipe may be avoided by setting up a magnetic field linked with the surrounding pipe and detecting changes in this magnetic linkage. The magnetic field is created by an inductor and since the inductance of the inductor varies with changes in the magnetic linkage, the magnetic changes are detected simply by observing changes in current flow through the inductor.

It is a simple matter to locate pipe joints by moving the inductor through the pipe since the break in continuity of the metal at a joint as well as the change in configuration of the pipe structure varies the magnetic linkage of the inductor with the surrounding pipe structure. Thus, the operator can locate pipe joints and make sure that a test for yield to the applied stress is carried out at a distance from a pipe joint.

The ability of the inductor to detect stress in the surrounding pipe structure depends upon the fact that stressing the pipe reduces its permeability to magnetic flux and thus causes a shift or redistribution of the magnetic field with consequent change in the impedance in the inductor circuit.

The detector unit disclosed in the above co-pending application is characterized by complete absence of any moving parts. The present invention, however, includes a movable member that changes position in response to changes in the magnetic linkage with the surrounding pipe, and this physical movement serves to increase the sensitivity of the detector unit as well as the strength of the indicating signal.

In the preferred practice of the invention, the movable member is what may be termed an armature that is at least partially supported by the magnetic field linked with the pipe and therefore shifts to various equilibrium positions in accord with changes in the distribution of the magnetic field. While the magnetic field may contribute support to the movable member by magnetic attraction, magnetic repulsion has certain advantages. In the preferred forms of the invention the armature is a magnet polarized in opposition to the polarity of the magnetic field for floating support by the field.

The invention may take the form of two closely adjacent oppositely wound electromagnets having straight iron cores, with the upper core floating above the lower core. Such an arrangement has unusually high sensitivity to changes in magnetic linkage with the surrounding pipe, because both electromagnets are magnetically linked with the pipe and any change in inductance of the two electromagnetic coils caused by change in the surrounding pipe is augmented by the consequent shift of the floating core relative to the upper coil.

The invention may also be practiced by substituting a permanent magnet for at least one of the two electromagnets. Thus, two permanent magnets may be employed, one floating above the other, with the floating magnet varying the inductance of a suitable detector coil. This arrangement provides the required magnetic linkage with the surrounding pipe and the required response to changes in that linkage but only the detector coil need be connected with a source of electric current.

In still another form of the invention, increased sensitivity as well as increased signal strength is obtained by employing a special detector coil with a core operatively connected with the floating armature.

Obviously, the invention has other uses in a well that depend upon responsiveness to the presence of metal or responsiveness to changes in configuration of the metal.

The various objects and advantages of the invention will be apparent from the following detailed description taken with the accompanying drawings.

In the drawings, which are to be regarded as merely illustrative,

Fig. 1 is a longitudinal section through a detector unit embodying one form of the invention;

Fig. 2 is a wiring diagram of an electrical arrangement that may be employed with the invention shown in Fig. 1;

Fig. 3 is a similar wiring diagram showing how a special detector coil may be added to the detector unit of Figs. 1 and 2;

Fig. 4 is a similar wiring diagram showing how at least one permanent magnet may be used in practicing the invention; and, Fig. 5 is a view on a reduced scale showing a detector unit passing through a pipe joint, the pipe structure being shown in section.

Fig. 1 shows a detector unit, generally designated 10, constructed in accord with my invention, the unit being shown inside a well pipe, generally designated 11. Preferably, but not necessarily, the essential elements of the detector unit are mounted in a tubular housing of nonmagnetic material such as non-magnetic stainless steel.

In the particular construction shown, the housing of the unit includes a tubular shell 14 into the lower end of which is threaded a solid nose 15 with a suitable sealing gasket 16. In like manner, the upper end of the shell 14 is threaded onto a special nipple 20 with the joint sealed by a gasket 21. The nipple 20 is shown threaded, in turn, into a socket member 22 at the end of a cable 23, this point also being sealed by a suitable gasket 24.

The cable 23 has a central conductor 25 which is protected in the cable by insulation 26 and which extends beyond the lower end of the cable into the housing of the detector unit.

The entrance of the conductor 25 into the housing may be sealed in any suitable manner. In the preferred arrangement shown in Fig. 1 the conductor 25 extends in a fluid-tight manner through a suitable bushing 30 that is formed with a head 31 at its outer end to receive a nut 32. Confined between the head 31 and the nut 32 is a suitable sleeve 33 of waterproof non-conducting material, preferably a suitable plastic. The sleeve 33 embraces the bushing 30 in a fluid-tight manner under compression by the nut 32 and has a circumferential recess in which is mounted a suitable sealing gasket 34.

The detector unit has an upper electromagnet, generally designated 37, with a coil 38 and a lower electromagnet, generally designated 40, with a coil 41, the two coils being wound on a single sleeve 42 made of suitable nonmagnetic material. The sleeve 42 has an enlarged lower end 43 abutting the nose 15, an intermediate enlargement 44 separating the two windings 38 and 41, and an enlargement 45 at its upper end. To keep the sleeve 42 fixed in position, a suitable coil spring 48 may be inserted in compression between the upper end of the sleeve and the adjacent lower end of the special nipple 20.

One side of the circuit for energizing the two electromagnets 37 and 40 is grounded and includes the cable 23, the cable socket 22, the special nipple 20, the spring 48 and the sleeve 42. The other side of the circuit includes the conductor 25 in the center of the cable, the coil 38 of the upper electromagnet 37, a short insulated wire 49 and the coil 41 of the lower electromagnet 40, the circuit being completed by grounding of this lower coil to the sleeve 42 as indicated at 50.

Inside the sleeve 42 a soft iron core 54 for the lower electromagnet 40 is seated with its lower end in a blind bore 55 in the nose 15, the core being secured against movement by a suitable set-screw 56. A similar core 58 for the upper electromagnet 37 is slidingly mounted in the upper portion of the sleeve 42 to serve as a movable armature. The two coils 38 and 41 of the two electromagnets are oppositely wound for opposite polarity so that the adjacent ends of the two cores 55 and 58 are both either north poles or south poles and, therefore, repel each other. As a result, the upper core 58 floats above the lower core 54 with an air gap therebetween as indicated at 60.

When the described detector unit is suspended in a string of pipe by the cable 23 and is suitably energized with electric current, magnetic lines of force flow from pole to pole of each of the two electromagnet cores 54 and 58 and, of course, the lines of magnetic force in seeking paths of least resistance concentrate in the surrounding pipe 11. If there is any change in the surrounding pipe such as a change in the continuity of metal or a change in the configuration of the pipe structure or a change in the stressing of the pipe around the detecting unit, there will be a consequent change in the resistance of the pipe to the magnetic lines of force and corresponding shift of the magnetic lines of force.

Any such redistribution of the lines of magnetic force not only causes a change in the inductance of the two electromagnet coils 38 and 41 but also causes a change in the amount of energy expended in making the upper core 58 float above the lower core 54. Thus, the upper core 58 continually seeks new positions of equilibrium as the magnetic field or fields produced by the detector unit continually changes in pattern or configuration in accord with changes in the surrounding pipe. The air gap 60 between the two poles increases as the surrounding metal of the pipe offers increased resistance to the magnetic lines of force and vice versa. In effect, the movements of the upper core 58 automatically augment the changes in inductance caused by shift of magnetic lines of force, especially the inductance of the upper electromagnet coil 38, the result being more sensitive detection and greater signal strength than would be possible with the upper core 58 maintained in fixed position.

By way of example, both of the coils 38 and 41 may be approximately 6 inches long and may comprise 10 layers or wraps of 24 gauge cotton-covered copper wire. The lower core 54 may be ¾ inch in diameter and 8 inches in length while the upper lighter core 58 may be approximately ½ inch in diameter by 7 inches in length. For locating pipe joints with the detector unit moving relative to the surrounding pipe, direct current may be used to energize the two electromagnets. With the detector unit stationary to detect response in stress on the part of the surrounding pipe, the current must vary continually in a cyclic manner and simple alternating current may be employed for this purpose. Alternating current is also operative for locating pipe joints by relative movement of the detector unit. In the preferred practice of the invention, however, with the coils and cores constructed as specified above, I prefer to use 100 volt direct current modulated by 20 volt 60 cycle alternating current. Such modulated direct current has been found satisfactory both for detecting pipe joints and for detecting stress changes in the surrounding pipe.

An electrical arrangement such as exemplified by Fig. 2 is suggested for this first form of the invention. In the wiring diagram one side of a suitable source of 100 volt direct current is connected to the cable 23 and the other side of the direct current source is connected by a wire 62 to the secondary coil of a modulating transformer 63, which transformer is energized by a suitable oscillator 64. The other side of the secondary coil of the transformer 63 is connected to the previously-mentioned conductor 25 that extends through the center of the cable 23, thus completing the circuit through the two electromagnets 37 and 40.

Any suitable means known to the art, including various bridge circuits, may be employed to detect or indicate changes in current flow through the described circuit. In the arrangement shown in Fig. 2 by way of example, a microvoltmeter 65 is connected across the cable 23 and conductor 25 with a condenser 66 added to block the flow of direct current.

The function of the described detector unit as a means for detecting or locating pipe joints depends upon the fact that movement of the unit through the pipe joint as shown in Fig. 5 causes the impedance of the circuit to vary in a characteristic manner. Merely lowering the unit through a string of pipe will reveal the particular behavior of the microvoltmeter needle that characterizes a joint structure of the particular pipe.

The detector unit may be lowered to any predetermined level either by measuring the footage of the cable 23 or by counting the pipe joints indicated by swings of the needle of the microvoltmeter 65 as the unit is lowered through the well pipe.

All tests for stress in the well pipe should be made at points spaced from the pipe joints but in the usual test procedure there is no way of making sure that a selected level for testing the pipe is at an intermediate point in a section of pipe instead of at a point in the pipe. In using the present device, however, it is possible to find out whether or not the detector unit is at or near a pipe joint simply by moving the unit up and down for a few inches while observing the needle of the microvoltmeter 65.

With the detector unit stationary at a level selected for a stress test to determine whether or not the pipe at the test level is above the point at which the pipe is stuck in the well, comparison is made between the reading of the microvoltmeter 65 when the upper end of the pipe is stressed and the reading of the microvoltmeter when the pipe is free from such stress.

In practice, the comparison is made simply by noting whether or not the needle of the microvoltmeter 65 responds when the stress is either applied or released. Thus, with the detector unit energized with the modulated direct current, the upper end of the well pipe 11 is stressed either in tension or in torque and the microvoltmeter is carefully observed for response. If the needle of the microvoltmeter fluctuates when stress is applied or released, the operator may deduce that the surrounding pipe responds to the stress applied at the top of the well and is therefore above the level at which the pipe is stuck. Repeating this procedure at various levels soon locates the highest level at which the pipe fails to respond to the applied stress and this level is of course the point at which the pipe is stuck.

After the stuck point of the pipe is found, it may be decided to unscrew the upper free portion of the pipe as close as possible to the stuck point so that the free portion may be withdrawn from the well. It has been found possible to cause a pipe in a well to unscrew at a selected joint by jarring the joint, for example with an explosive charge, while the pipe is under torque in the direction to unscrew the joint. A feature of the present invention is that it makes possible accurate placing of the explosive. Once the stuck point of the pipe is located, the detector unit may be raised from that level while energized to find the precise location of the first pipe joint above the stuck point. The level of the pipe joint is ascertained from the footage of the cable 23 for guidance in lowering the explosive charge into place.

Fig. 3 shows how a special detector coil 70 connected across the circuit in parallel with the two electromagnets 37 and 40 may be added to the arrangement above described to obtain even greater sensitivity and signal strength. Such a detector coil may be, for example, 2 inches long and comprise 10 wraps or layers of 28 gauge cotton-covered wire. The detector coil 70 has a movable soft iron core 71, say ½ inch in diameter by 2 inches long that is fixedly connected to the previously-mentioned floating core or armature 58 by a rod 72 of plastic or other light-weight non-magnetic material. Since movement of the floating core 58 is transmitted to the smaller iron core 71 the inductance of the detector coil 70 varies simultaneously with the inductance of the electromagnet coils indicating changes in current flow through the circuit. In all other respects, the diagram in Fig. 3 is identical with the diagram in Fig. 2 as indicated by the use of corresponding numerals to indicate corresponding parts.

The wiring diagram in Fig. 4 has two purposes: first, to illustrate the fact that in any of the various forms of the invention the movable armature or floating core may be partially supported or counter-balanced by suitable yielding means; and, second, to show by way of example how one or more permanent magnets may be used instead of electromagnets in practicing the invention.

While only one of the electromagnets 37 and 40 may be replaced by a permanent magnet, if desired, both of the electromagnets are replaced in Fig. 4. Thus, a fixed permanent magnet in the form of a straight bar 75 replaces the previously-mentioned electromagnet 40 and a similar permanent magnet 76 replaces the electromagnet 37. The permanent magnet 76, which serves as the floating armature, may be partially supported by a suitable coil spring 76 that is suspended from a suitable adjustable means such as a threaded adjustment rod 80. The adjustment rod 80 extends loosely through an oversized bore (not shown) in a fixed support or bracket 81 and is held in place by an adjustment nut 82 abutting the upper surface of the support. It is apparent that the force exerted by the spring 77 on the floating electromagnet 76 at any given position of the electromagnet can be adjusted by turning the adjustment nut 82 on the rod 80.

The upper permanent magnet 76 extends into an inductor or detector coil 83. By way of example, the detector coil 83 may be 5 inches long and comprise 10 layers or wraps of 26 gauge cotton-covered wire; the upper electromagnet 76 may be a round bar ½ inch in diameter by 3 inches long; and the lower permanent magnet 75 may be 1 inch in diameter and 6 inches long.

The wiring diagram in Fig. 4 shows a suitable oscillator 84 energizing a transformer 85 with one side of the transformer connected to the previously-mentioned cable 23 and the other side connected to the conductor 25 inside the cable. Preferably a resistance 86, say a 100 ohm resistance, is placed in the circuit on each side of the transformer 85 and the detector coil 83 is energized with 5 or 10 A. C. current, the current flow being as low as 5 milliamperes.

For detecting changes in current flow through the circuit, a microvoltmeter 87 may be used as heretofore explained to indicate changes in impedance in the circuit caused by shifts in the position of the floating permanent magnet 76. It is possible to employ current of such low magnitude without sacrificing efficiency, sensitivity or signal strength because no current is required to create the magnetic field that links with the surrounding pipe and no current is required to support the floating armature or upper magnet 76.

Other specific uses may be found for the invention. For example, a considerable length of pipe may be lodged in a key seat spaced away from the well bore on the inner side of a bend in the bore. Conventional devices lowered through the bore would by-pass such pipe without giving any clue. The present invention, however, would detect the pipe magnetically notwithstanding the fact that the pipe lies entirely outside the well bore proper.

It will be apparent to those skilled in the art that the described invention is not limited to the particular forms or particular uses set forth herein and it will be understood that various departures may be made from the present disclosure within the scope and spirit of the appended claims.

I claim:

1. In a device of the character described for exploring pipe in a well, the combination of: a detector unit dimensioned for lowering into the pipe; means carried by said unit to set up a magnetic field that links with the surrounding pipe to a degree varying with the configuration and stressing of the pipe; an armature at least partially supported by said magnetic field to float through a range of equilibrium positions in response to variations in the field; and indicating means including a detector coil magnetically coupled with said armature for response to movement of the armature from one equilibrium position to another.

2. In a device of the character described for exploring pipe in a well, the combination of: a detector unit dimensioned for lowering into the pipe; means carried by said unit to set up a magnetic field that links with the surrounding pipe to a degree varying with the configuration and stressing of the pipe; a floating armature at least partially supported by said magnetic field for movement through a range of equilibrium positions in response to variations in the field; an inductor carried by said unit responsive to movement of said armature; and an indicating circuit responsive to said inductor.

3. A device as set forth in claim 2 in which said inductor is a coil and said armature extends into the coil to vary the inductance thereof for control of said indicating circuit.

4. In a device of the character described for exploring pipe in a well, the combination of: a detector unit adapted for lowering in the pipe; a lower magnet carried by said unit for magnetic linkage with the surrounding pipe; an upper magnet movably carried by said unit, said upper magnet being reversed in polarity relative to said lower magnet and being at least partially supported by magnetic repulsion with respect to the lower magnet whereby the upper magnet floats above the lower magnet and moves through a range of equilibrium positions in response to changes in the magnetic linkage of the lower magnet with the surrounding pipe; and indicating means responsive to movements of said upper magnet.

5. A device as set forth in claim 4 in which at least one of said magnets is an electromagnet.

6. A device as set forth in claim 4 in which at least one of said magnets is a permanent magnet.

7. A device as set forth in claim 4 in which said upper magnet is partially supported by yielding means.

8. A device as set forth in claim 4 in which said yielding means is a spring adjustable to vary the degree to which it supports the upper magnet.

9. In a device of the character described for exploring pipe in a well, the combination of: a detector unit adapted for lowering in the pipe; a lower magnet carried by said unit for magnetic linkage with the surrounding pipe; an upper magnet movably carried by said unit, said upper magnet being reversed in polarity relative to said lower magnet and being at least partially supported by magnetic repulsion with respect to the lower magnet whereby the upper magnet floats above the lower magnet and moves through a range of equilibrium positions in response to changes in the magnetic linkage of the lower magnet with the surrounding pipe; an inductor carried by said unit responsive to movement of said upper magnet; and indicating means responsive to said changes in said inductance.

10. A device as set forth in claim 9 in which said inductor is a coil and said upper magnet extends into the coil.

11. A device as set forth in claim 9 in which said inductor is a coil having a core connected with said upper magnet by non-magnetic material.

12. A device as set forth in claim 9 in which said upper magnet is an electromagnet with a floating core and in which said coil constitutes said inductor.

13. A device as set forth in claim 12 in which said coil is energized with direct current for constant polarization of the floating core and said direct current is modulated for detection of changes in the inductance of the coil.

14. In a device of the character described for exploring pipe in a well, the combination of: a detector unit dimensioned for lowering into the pipe; means carried by said unit for setting up a magnetic field to link with the surrounding pipe to various degrees in accord with changes in configuration of the pipe structure or changes in stress in the pipe, a ferromagnetic member carried by said unit for movement through a range of positions, said member being biased towards one end of said range, said member being positioned to be urged by said magnetic field towards the other end of said range whereby the member seeks equilibrium positions in said range in accord with changes in said magnetic field; and indicating means responsive to movement of said member throughout said range to indicate the various equilibrium positions of said ferromagnetic member.

References Cited in the file of this patent

UNITED STATES PATENTS

| | | |
|---|---|---|
| 2,010,813 | Dysart | Aug. 13, 1935 |
| 2,136,914 | Drake | Nov. 15, 1938 |
| 2,318,666 | Bruce | May 11, 1943 |

FOREIGN PATENTS

| | | |
|---|---|---|
| 433,620 | Great Britain | Aug. 14, 1935 |